US012788121B2

(12) United States Patent
Michaelis

(10) Patent No.: US 12,788,121 B2
(45) Date of Patent: Nov. 10, 2026

(54) LUGGAGE SYSTEM AND APPARATUS

(71) Applicant: Harald Simon Michaelis, Pascoe Vale (AU)

(72) Inventor: Harald Simon Michaelis, Pascoe Vale (AU)

(73) Assignee: Harald Simon Michaelis, Pascoe Vale (AU)

( * ) Notice: Subject to any disclaimer, the term of this patent is extended or adjusted under 35 U.S.C. 154(b) by 0 days.

(21) Appl. No.: 18/022,064

(22) PCT Filed: Aug. 17, 2021

(86) PCT No.: PCT/AU2021/050905

§ 371 (c)(1),
(2) Date: Feb. 17, 2023

(87) PCT Pub. No.: WO2022/036395

PCT Pub. Date: Feb. 24, 2022

(65) Prior Publication Data

US 2023/0354976 A1 Nov. 9, 2023

(30) Foreign Application Priority Data

Aug. 17, 2020 (AU) ................................ 2020902914

(51) Int. Cl.

| | |
|---|---|
| ***A45C 13/04*** | (2006.01) |
| ***A45C 5/03*** | (2006.01) |
| ***A45C 5/14*** | (2006.01) |
| ***A45C 13/26*** | (2006.01) |
| ***B64D 9/00*** | (2006.01) |
| ***B65D 21/02*** | (2006.01) |

(52) U.S. Cl.
CPC ................ *A45C 13/04* (2013.01); *A45C 5/03* (2013.01); *A45C 5/14* (2013.01); *A45C 13/262* (2013.01); *B64D 9/00* (2013.01); *B65D 21/023* (2013.01); *A45C 2005/037* (2013.01); *A45C 2013/267* (2013.01)

(58) Field of Classification Search
CPC ......... A45C 13/04; A45C 5/03; A45C 13/262; A45C 2005/037; A45C 2013/267; B64D 9/00; B65D 21/023
See application file for complete search history.

(56) References Cited

U.S. PATENT DOCUMENTS

| | | | | |
|---|---|---|---|---|
| D248,015 S * | 5/1978 | Smith | ............................ | D3/294 |
| 4,813,521 A * | 3/1989 | Goldstone | ................ | A45C 7/00<br>190/18 A |
| 4,863,222 A * | 9/1989 | Posso | ................ | A47B 87/0292<br>312/107 |
| D333,094 S * | 2/1993 | Zutler | ............................ | D9/423 |

(Continued)

FOREIGN PATENT DOCUMENTS

KR 20170135753 A * 12/2017

*Primary Examiner* — Tri M Mai
(74) *Attorney, Agent, or Firm* — Bochner PLLC; Andrew D. Bochner

(57) ABSTRACT

A stackable luggage system comprising: a plurality of luggage units, each luggage unit comprising a body orientated to have an upper surface and a lower surface, wherein a leading edge of the lower surface and a trailing edge of the upper surface is chamfered to facilitate sliding movement of an upper luggage unit over a lower luggage unit when the luggage units are arranged in a vertical stack.

7 Claims, 8 Drawing Sheets

(56) References Cited

U.S. PATENT DOCUMENTS

| | | | | |
|---|---|---|---|---|
| 6,253,948 | B1 * | 7/2001 | Ficker .................. | B65D 25/005 220/676 |
| 8,561,769 | B2 * | 10/2013 | Andochick .............. | A45C 5/14 190/18 R |
| 2004/0007483 | A1 * | 1/2004 | Hasebe .................... | A45C 5/04 206/314 |
| 2011/0147385 | A1 * | 6/2011 | Forrest ................... | B25H 3/023 220/694 |
| 2014/0197059 | A1 * | 7/2014 | Evans ...................... | B25H 3/02 206/349 |

* cited by examiner

LUGGAGE SYSTEM AND APPARATUS

RELATED APPLICATIONS

The present application claims priority from Australian provisional patent application no 2020902914 filed on 17 Aug. 2020, the entire contents of which are incorporated herein by reference.

FIELD OF INVENTION

The present invention relates generally to a luggage system, and in particular, to a luggage system and luggage items used with the system to provide for standardised handling and storage of items in an efficient and cost effective manner.

BACKGROUND OF THE INVENTION

In recent times, national and international travel has become commonplace within most societies. This has largely been due to the ability of airlines to offer fares at affordable prices. As such, the airline industry has undergone considerable change over the years to increase operating efficiencies and reduce operating costs in order to maintain air fares at such an affordable price.

Due to the popularity of air travel, airlines have become adept at processing large numbers of passengers at check-in points to minimise waiting times and maximise throughput. Larger aircrafts have made it possible to maximise the number of passengers that can be accommodated on flights and with increased competition, many airlines are beginning to realise that in order to continue to offer discount air fares, their profit margins are becoming reduced.

Whilst new technology has made it possible to automate the processing of large volumes of passengers through the use of electronic check-ins and self check-in facilities, the handling of passenger luggage still requires considerable manual intervention, and thus cost. Baggage handlers are generally required by airlines to manually load and unload passenger luggage onto/from the aircraft at the commencement and conclusion of flights. As passenger luggage is not regulated and comes in a variety of different shapes and sizes, each piece of luggage must be manually packed into a unit load device (ULD) for storage in the cargo-hold of the aircraft. This can become difficult to manage and control, especially when the size and weight of the individual luggage items differs considerably between passengers. Such an issue becomes a particular problem in relation to ensuring that the cargo weight of the aircraft is properly distributed throughout the aircraft.

As a result, there are considerable labour factors associated with handling and managing luggage, including cost and time, both of which can have a negative effect on an airlines profit margin. Thus, there is a need to provide for a luggage system and luggage items that offer a more automated means for handling luggage at an airport, both prior to departure and after landing.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a luggage unit comprising:

- a substantially rigid body having a first portion at least partially releasably attached to a second portion to define a storage space for storing items therein;
- the first portion having an outer surface with a plurality of rail members extending longitudinally thereon, each rail member projecting above the outer surface of the first portion to form at least one channel therebetween; and
- the second portion having an outer surface with at least one rail member extending longitudinally thereon, the or each rail member projecting above the outer surface of the second portion, and configured to conform to the at least one channel formed in the outer surface of the first portion;
- wherein both the first portion and the second portion have a chamfered edge formed along opposing ends thereof.

The luggage unit may be configured to be vertically stacked on another luggage unit configured according to the first aspect of the invention, such that the or each rail member of the second portion of an upper luggage unit is received within a channel formed in the first portion of a lower luggage unit.

The at least one channel formed in the first portion may have a locking ridge extending orthogonally therein and the at least one rail member formed in the second portion has a recess extending orthogonally therein, such that when the upper luggage unit is mounted on the lower luggage unit the locking ridge of the lower luggage unit engages with the recess formed in the upper luggage unit to prevent sliding movement and to act as a locating mechanism between the upper luggage unit and the lower luggage unit A handle member may be retractably mounted to the second portion so as to be received within a recess formed between each rail member.

At least two wheels may be mounted to the body to facilitate movement of the luggage unit According to another aspect of the invention, there is provided a luggage system comprising:

- a plurality of luggage units, each luggage unit having a substantially rigid body having a first portion at least partially releasably attached to a second portion to define a storage space for storing items therein; the first portion having an outer surface with a plurality of rail members extending longitudinally thereon, each rail member projecting above the outer surface of the first portion to form at least one channel therebetween; and the second portion having an outer surface with at least one rail member extending longitudinally thereon, the or each rail member projecting above the outer surface of the second portion, and configured to conform to the at least one channel formed in the outer surface of the first portion; wherein both the first portion and the second portion have a chamfered edge formed along opposing ends thereof;
- wherein the luggage units are configured to be stacked in a vertical manner such that such that the or each rail member of the second portion of an upper luggage unit is received within a channel formed in the first portion of a lower luggage unit.

In accordance with yet another aspect, the present invention provides a stackable luggage system comprising: a plurality of luggage units, each luggage unit comprising a body orientated to have an upper surface and a lower surface, wherein a leading edge of the lower surface and a trailing edge of the upper surface is chamfered to facilitate sliding movement of an upper luggage unit over a lower luggage unit when the luggage units are arranged in a vertical stack.

In one embodiment, the upper surface of each luggage unit is configured to mate with a lower surface of the upper luggage unit in the vertical stack. One of the upper or lower surface of each luggage unit may have one or more rail members formed therein and the other of the upper or lower surface of each luggage member may have one or more channels formed therein.

The one or more channels may be configured to conform to the one or more rail members such that when the upper luggage unit is positioned on a lower luggage unit, at least one rail member of the upper or lower luggage unit may be received within the channel member of the upper or lower luggage unit to provide for interengagement between the stacked luggage units.

In one form, each luggage unit may be arranged in the vertical stack such that an upper luggage unit may be supported on a lower luggage unit. In another form, each luggage unit may be arranged in the vertical stack such that an upper luggage unit may be supported between a pair of lower luggage units.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

Whilst the system of the present invention will be described below in relation to luggage for loading onto an aircraft ULD, it will be appreciated that the luggage system and individual luggage items of the present invention could be used in any transport situation, including rail, bus, car, air and interstellar/space transport.

Figure 1:
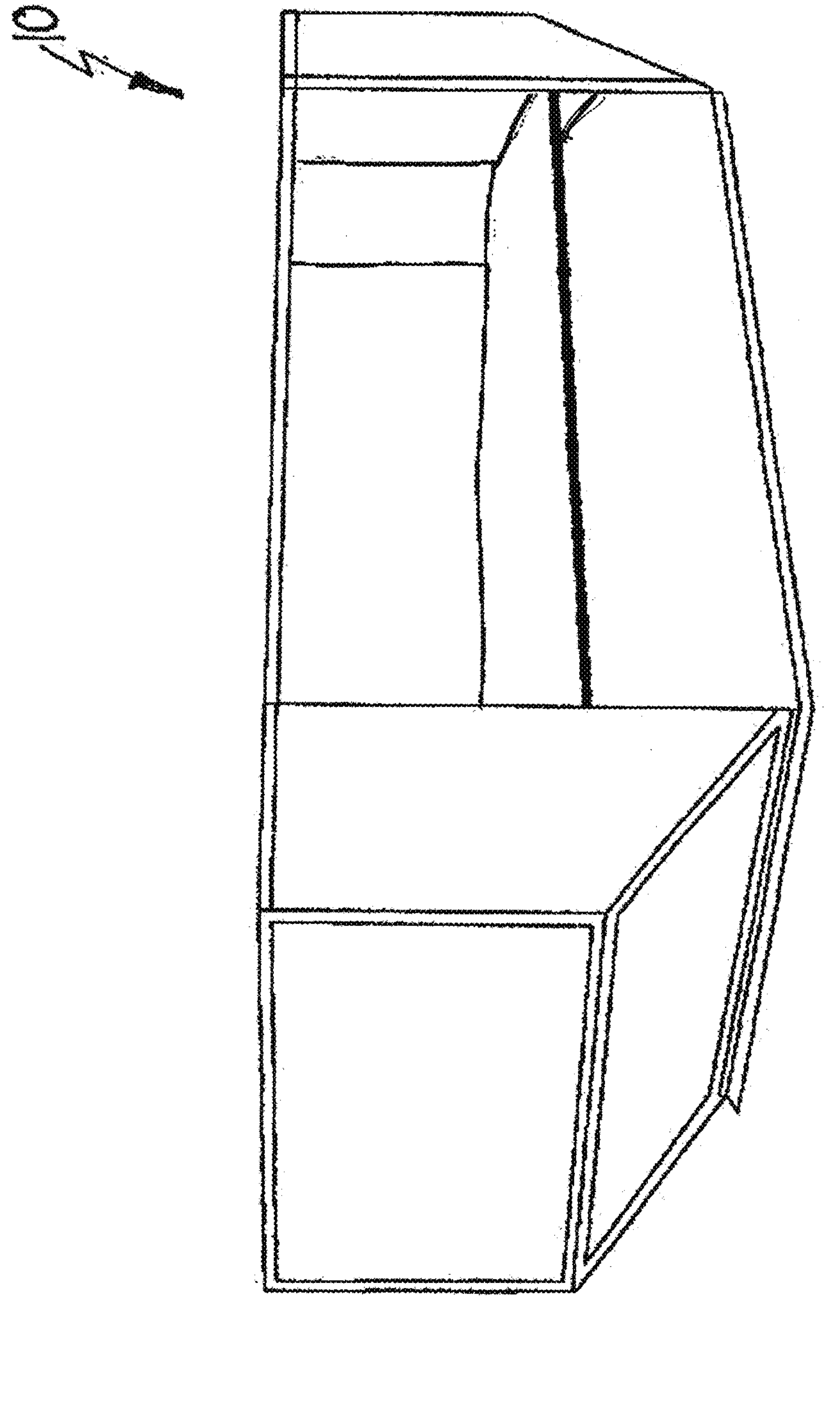
FIG. 1 is view of a typical unit load device (ULD) used in aircraft in accordance with the prior art.

Referring to FIG. 1, a typical unit load device (ULD) 10 used in aircraft for containing luggage is depicted. The ULD 10 is typically in the form of a container configured to store a large volume of cargo, typically luggage but also other cargo items, in a single location. Typically, baggage handlers load the ULDs with passenger luggage and other items prior to take-off and each ULD has its own manifest or list of goods setting out the items contained therein. As is depicted the ULD is shaped to fit within the body of the aircraft and as such it may take a variety of different shapes and configurations, depending on the aircraft being used and the region of the aircraft in which the ULD is to be located. Such storage devices have been effective in reducing loading and unloading times, thereby reducing flight delays, as they provide a means for mass handling of individual luggage items on and off the aircraft. Nevertheless, ULDs do require extensive manual loading and the items of luggage that are to be stored in the ULDs require capture on the manifest and as such, this work is labour intensive and is a cost that the airlines must absorb as part of their overall operating costs.

Referring to FIGS. 2-5, a luggage case 20 in accordance with an embodiment of the present invention is depicted.

Figure 6:
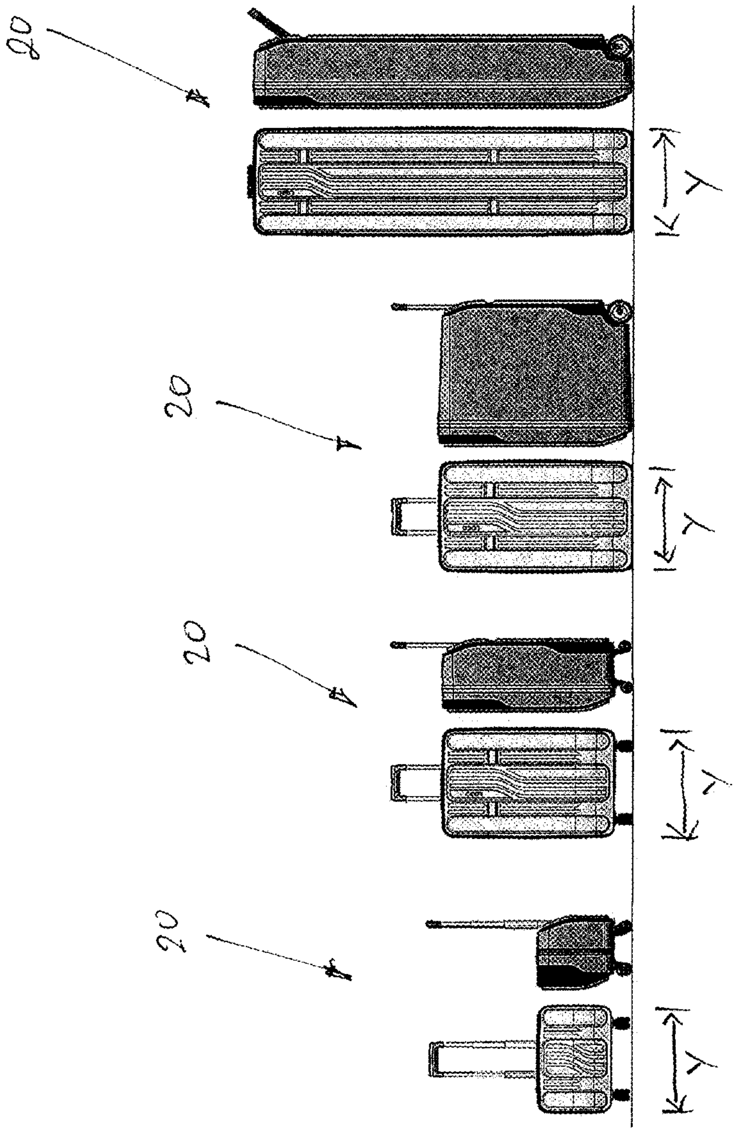
FIG. 6 are front and side views of a range of different sixed and shaped luggage units in accordance with the present invention.

The case 20 is intended to come in standardised sizes for use by all passengers on a flight. In this regard, case 20 may come in two or more standardised sizes that is consistent and intended to be used as a standard luggage item for all passenger use. In a preferred from, the case 20 may come in an extra-small, small, medium and large sizes to accommodate the different luggage requirements of passengers, as is depicted in FIG. 6.

The case 20 is preferably made from a robust material, such as polypropylene or similar plastic material, to form a hard shell about the contents of the case, to protect the contents contained therein. The case 20 has a first body portion 22 that is attached to a second body portion 24 by way of a zipper 25, hinges, or similar device, to facilitate opening of the case 20 to access the internal storage compartment of the case 20. The first body portion 22 has an external surface 23, which is shown more clearly in FIG. 5, having rails 21 extending longitudinally thereon. The rails 21 comprise a wider central rail and two narrower rails located adjacent the edge of the case 20, as shown. The rails 21 are arranged to define two channels 27 extending therebetween for receiving and mating with another case 20, in a manner that will be described in more detail below. It will be appreciated that the shape and configuration of the rails 21, and in turn the channels 27, can vary and will be dependent upon the width of the case 20.

Figure 7:
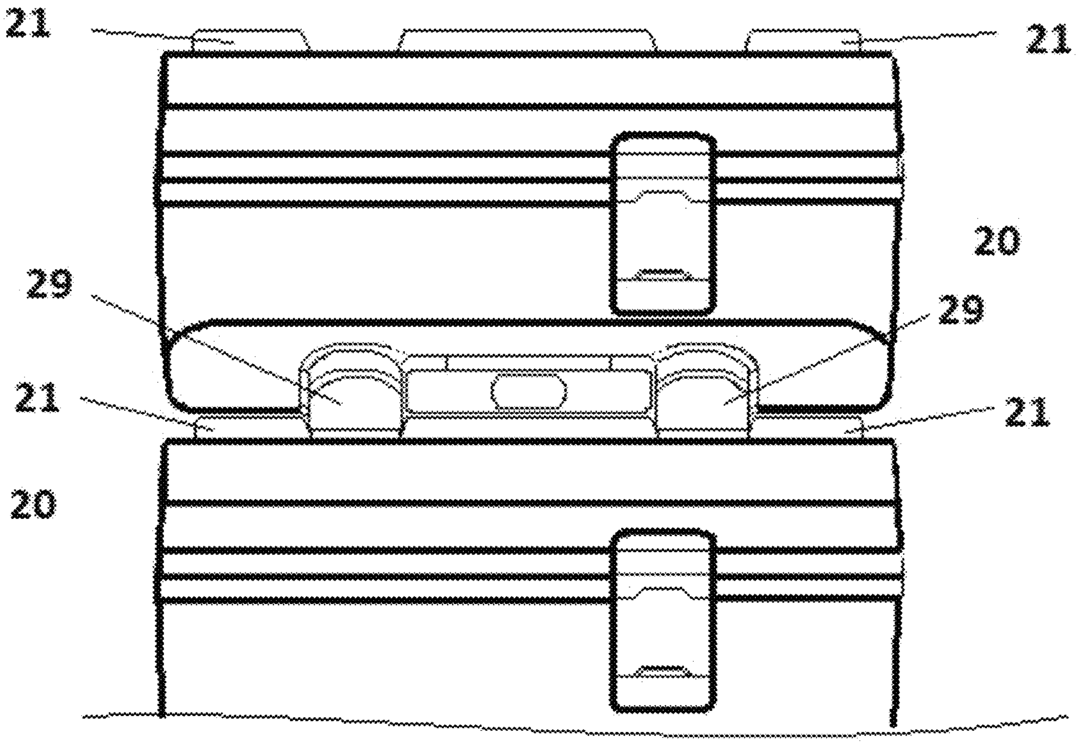
FIG. 7 is a front view of the luggage case of FIG. 2 in a stacked configuration.

As discussed above, the second body portion 24 is configured to mate with the first body portion 22 to store items therein and to facilitate separation of the first body portion 22 from the second body portion 24 so as to provide access to the internal storage compartment of the case 20. As can be seen more clearly in FIG. 4, the second body portion 24 has an outer surface 26 comprising a pair of rails 29 that extend longitudinally along the length or height (depending on the orientation) of the case 20, as depicted. The rails 29 are separated a predetermined distance such that when the case 20 is positioned on top of another case 20, the rails 29 are received within the channels 27 formed in the first body portion 22 of that lower case 20, in the manner as depicted in FIG. 7. This results in the cases 20 inter-engaging when positioned in such a stacked manner.

Wheels 28 are located on an end of the case 20. In the embodiment as depicted in FIGS. 2-5, four wheels 28 are provided on the end of the case 20 to support the case 20 upon a ground surface when the case is in an upright manner as shown. As depicted in FIG. 6, for larger cases a pair of wheels may be mounted along an edge if the end of the case 20 to provide a means for moving the case in a conventional manner. The wheels 28 may be in the form of castor wheels or may be conventional disk shaped wheels.

Figure 4:
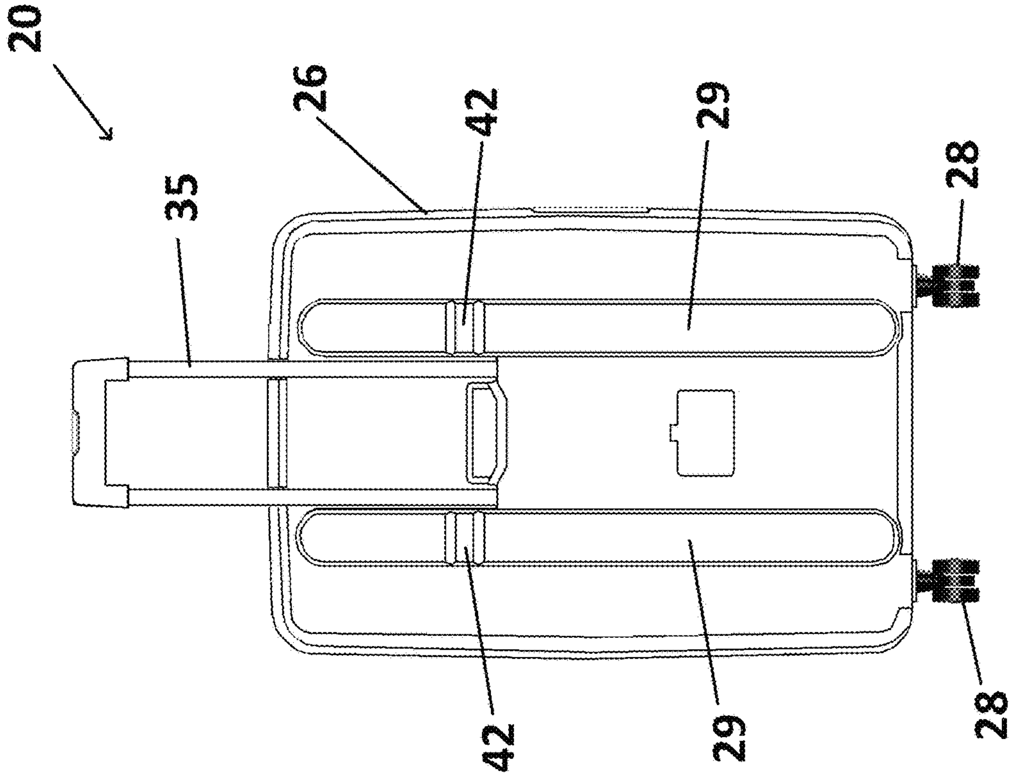
FIG. 4 is a rear view of the luggage unit of FIG. 2.

A handle 35 may be retractably mounted to the surface 26 of the second body portion 24 as is shown in FIG. 4. The handle 35 is mounted between in the depression formed between the rails 29 and is extendible therefrom to project above the upper end of the case 20, as shown. The handle 35 enables a user to conveniently push and steer the case 20 as required.

Figure 2:
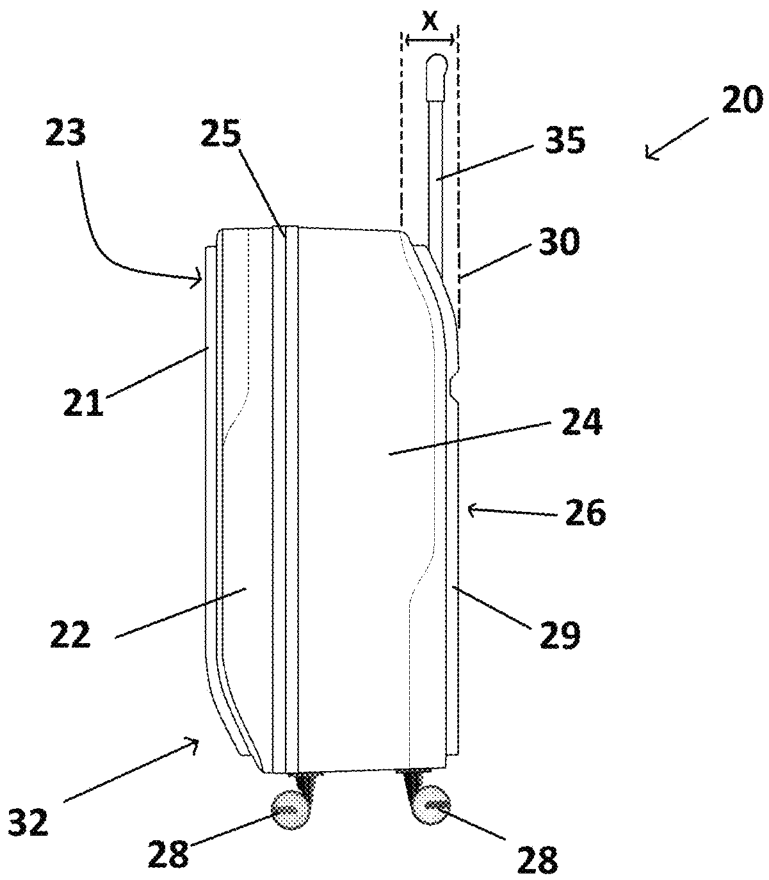
FIG. 2 is a side view of a luggage unit in accordance with an embodiment of the present invention.
Figure 3:
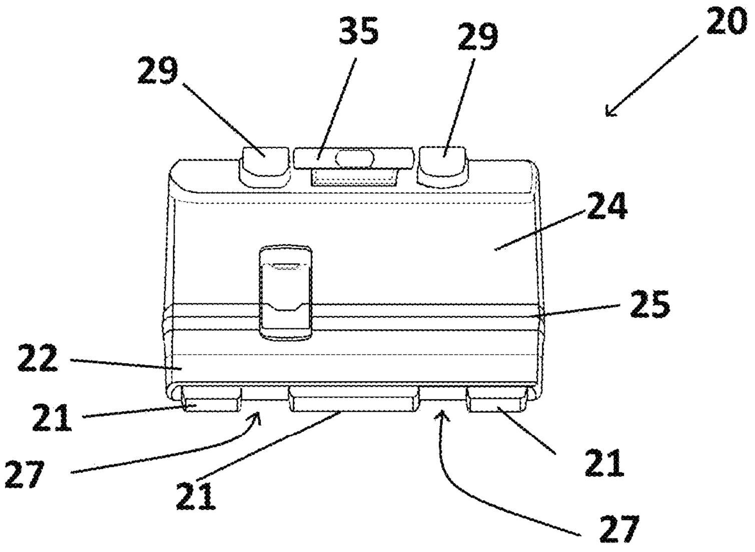
FIG. 3 is an end view of the luggage unit of FIG. 2.

As can be more clearly seen in FIG. 2, the leading or front edge 30 of the second body portion 24 of the case 20 is configured to form a chamfered or angled surface so as to provide a degree of clearance 'X' along this edge. Such a clearance 'X' is sufficient to assist the case 20 in being slid into position over a lower case for stacking in an interlocking manner. Similarly, a rear edge 32 of the front body portion 22 is configured to have a chamfered or angled surface to facilitate stacking of multiple cases 20 atop each other, as will be discussed in more detail below.

As shown in FIG. 7, the cases 20 can be simply stored atop of each other such that the rails 29 of the upper case 20 are slidingly received in the channels 27 of the lower case 20. Such an interference fit between adjacent vertical cases 20 ensures stability of the stack of cases as they are being assembled for storage in a ULD or similar device.

Figure 10:
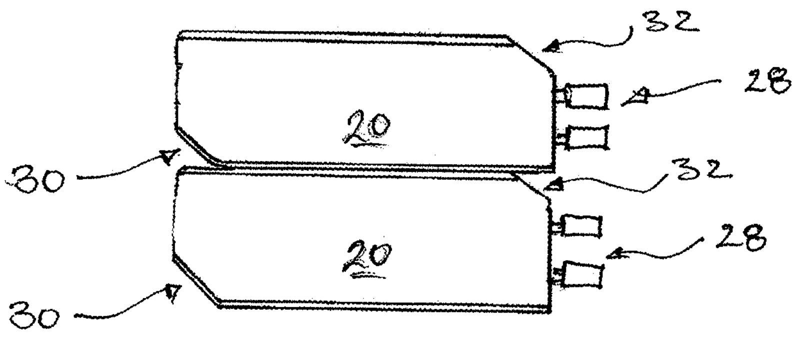
FIG. 10 is a side view depicting a pair of luggage units arranged in a vertical stack.

FIG. 10 shows a side view of two cases 20 stacked in a vertical orientation in the manner as depicted in FIG. 7. In this embodiment, the top case 20 is able to be slid onto the lower case 20 such that the rails 29 provided on the undersurface of the upper case 20 are received within the channels formed in the upper surface of the lower case 20. As is shown, both the leading or front edge 30 of the undersurface of the upper case 20 and the rear or trailing edge 32 of the upper surface of the lower case 20 has a chamfered or angled disposition. As such, when the upper case 20 is slid onto the lower case 20, there is sufficient clearance to facilitate receipt of the rails 29 of the upper case within the channels 27 of the lower case. This can be achieved with minimal need for handling by a baggage handler, thereby ensuring that the process of stacking the cases can be simply automated.

Figure 5:
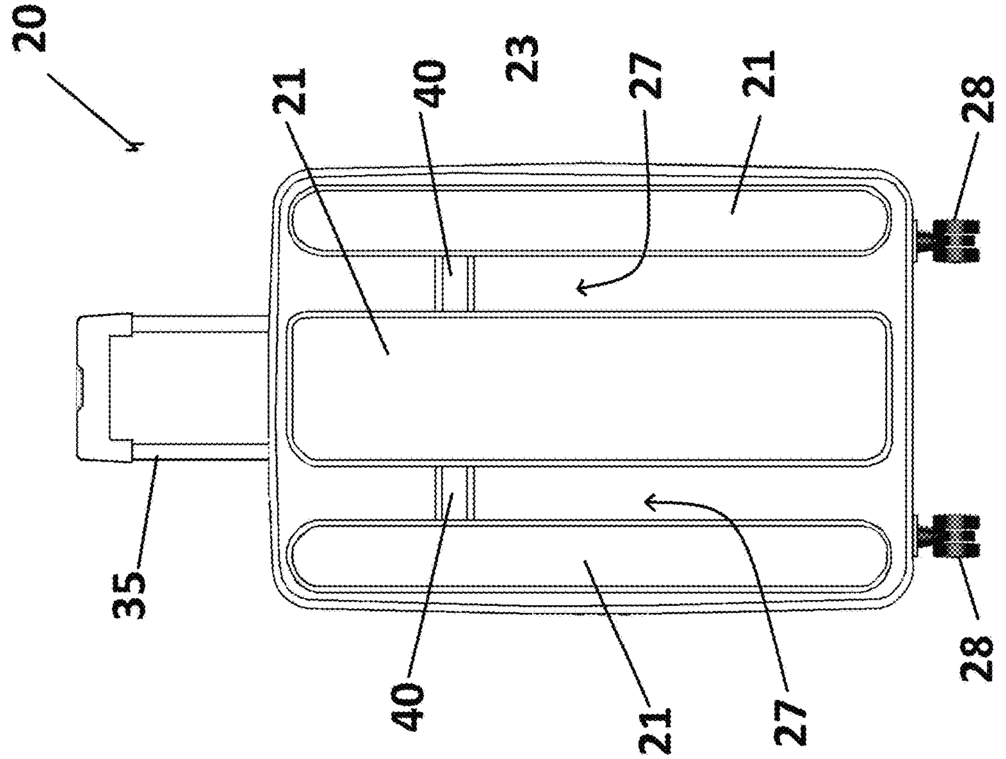
FIG. 5 is a front view of the luggage unit of FIG. 2.

As is shown in FIGS. 4 and 5, to prevent sliding movement of the cases 20 when they are stacked in a vertical manner, the channels 27 each have a locking ridge 40 extending in a transverse manner with respect to the orientation of the channels 27. The locking ridge 40 projects above the surface of the channels 27 and is received in a corresponding recess 42 formed in the rails 29 of the lower case 20 when the case 20 is slid into the stacked position. This provides an interlock between vertically adjacent cases 20 to prevent sliding movement therebetween.

Figure 11:
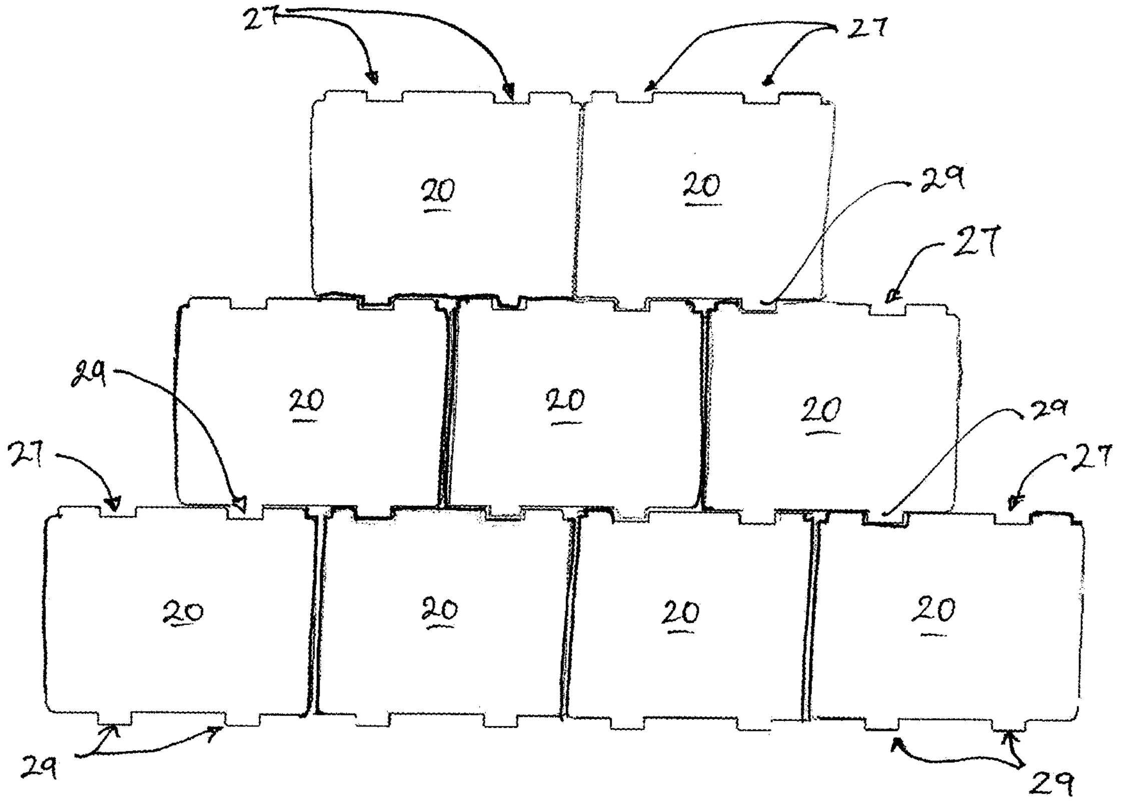
FIG. 11 is a front view of a vertical stack of luggage units in accordance with an embodiment of the present invention.

As is depicted in FIG. 11, due to the standardised shape of the cases 20, the cases 20 can be vertically stacked in a staggered or overlapping manner. In this arrangement, rails 29 of an upper case 20 are received in channels 27 of adjacent lower cases 20. Such a stacking arrangement provides for enhanced stability of the stacked cases.

Figure 8:
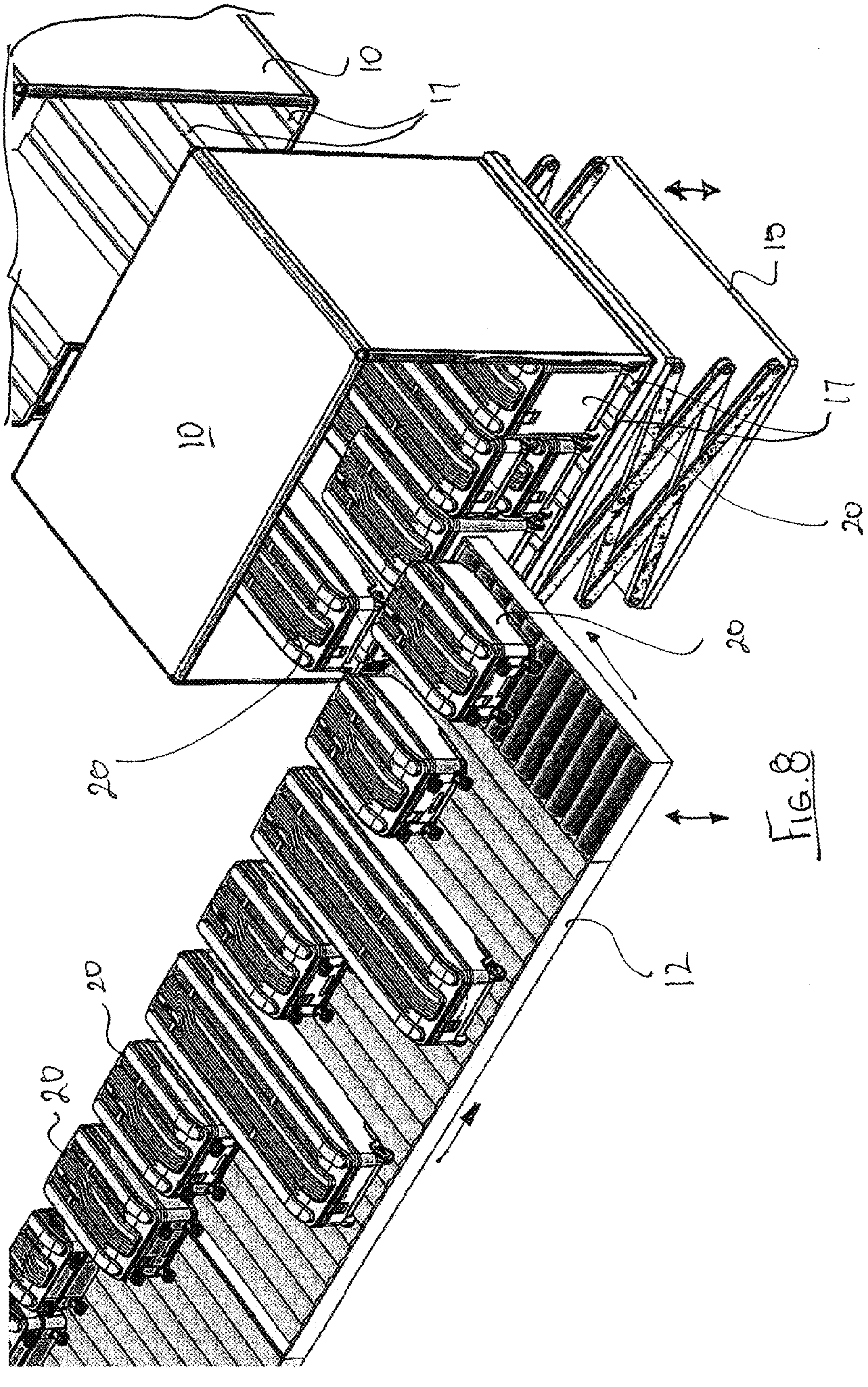
FIG. 8 is a perspective view showing a manner in which the luggage units of the present invention are loaded into a ULD in accordance with one embodiment of the present invention.

Referring to FIG. 8, an embodiment of the present invention is depicted showing how a ULD 10 can be simply loaded with the cases 20 in an automated manner.

The ULD 10 can be mounted on a scissor lift arrangement 15 that can be raised and lowed by robotic control in accordance with the level of cases 20 present within the ULD 10. The cases 20 to be loaded are positioned on a conveyor system 12 for delivery to the ULD 10. The conveyor system 12 may also, or may alternatively, be configured to be raised/lowered as required to deliver the cases into the ULD. Each of the cases 20 are aligned upon the conveyor system 12 such that they are supported on the outer surface 26 of the second body portion 24 and the outer surface 23 of the first body portion 22 is arranged uppermost. In such a configuration, the angled edge 32 of the first body portion 22 is positioned in a rearward manner such that the angled edge 30 of the second body portion is located toward the ULD 10 on the underside of the case 20.

The base of the ULD will be configured to have channels 17 formed therein to replicate the channels formed in the upper surface of the cases 20. To achieve this a liner may be provided to extend over the inner surface of the base of the ULD 10. In this regard, the cases can be simply slid into position into the ULD such that the rails 29 formed in the undersurface of each case 20 are received within the channels 17 formed in the base of the ULD.

Figure 9:
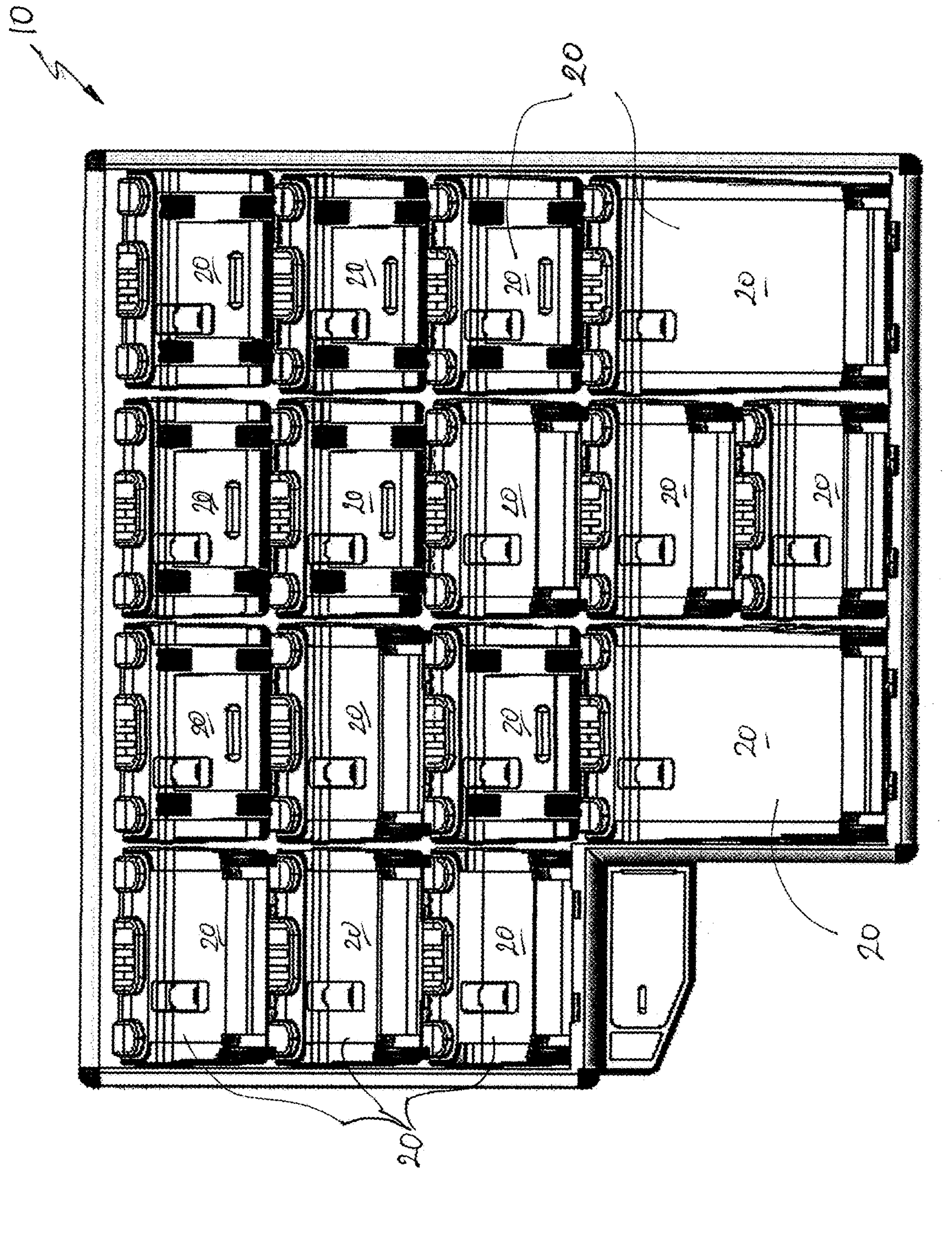
FIG. 9 is a side view of a ULD loaded with luggage units in accordance with the present invention.

In such a configuration, due to the width of the cases 20 being the same, an upper layer of cases 20 to be loaded can be simply slid onto the external surface 23 of an already loaded case in the manner as previously discussed in relation to FIG. 10 or FIG. 11. As the undersurface of the case to be loaded has the angled edge 30 as its leading edge and the already loaded case has the angled edge 32 as its upper trailing edge, there is significant clearance to assist in the rails 29 being received within the channels 27 of the already loaded case. Thus, the case 20 can be simply pushed and guided into position on top of the loaded case. Each case can then be loaded in a similar manner to provide a stacked ULD, as is depicted in FIG. 9. Once the ULD has been filled with cases 20, it can then be loaded into the aircraft as required. It will be appreciated that the ULD can be unloaded in the same simple and automated manner.

Each case 20 may have a readable data card (not shown) mounted in the body. The data card may be moulded into the internal or external surfaces 23, 26 such that they can be simply read by an appropriate reader as they pass along the conveyor system. As such, a manifest of the cases 20 loaded into the ULD can be automatically taken with minimum manual input required and can also pinpoint the exact location of an individual item of luggage stored within the ULD. The data card may take any variety of known forms, including an RFID chip or similar readable technology.

It will be appreciated that, because each case 20 is of a standardised form and structure, security and customs personnel are able to simply access the case 20 and bypass the lock of the case 20 using a standard unlocking system to check and inspect the contents being carried by the case 20. This significantly improves the efficiency of the security procedures in the airport, as the officials responsible for performing such checks do not have to handle different locks and security settings associated with a myriad of different types of luggage cases as is common in existing arrangements. Further, as the cases share a similar construction and are made from the same hard surface material, the cases can be easily sanitised or undergo BIO hazard cleaning as part of the handling process.

It will be appreciated that by providing a case 20 that has a standardised shape and size, as well as a standard construction and configuration, a traveller can simply enter the airport and once checked-in to their flight their luggage can be delivered to the appropriate collection and loading area in a conventional manner. The cases collected for loading can be simply loaded into a desired ULD or similar cargo storage system where they are designed to inter-engage and fit together to maximise storage space. The cases 20 are configured to easily slide over each other and share the same dimensions, greatly reducing the manual requirements on personnel associated with handling and loading various sized and shaped luggage items.

It will also be appreciated that at the arrival terminal, once the ULD has been removed from the cargo hold of the airplane, the individual cases 20 can be easily unloaded from the ULD and delivered to the collection point for collection by the passenger. This can be done in a simple and efficient manner and due to the consistent shape and size of the cases, Storage devices, carriage vehicles and other handling equipment can be easily adapted to be used with such cases.

It will be appreciated that due to the configuration of the cases 20, the manner in which they can be loaded/unloaded from the ULDs could vary. As the cases are configured to slide over the other cases in a stacked manner, the cases could also be gravity fed, belt fed or power fed into the ULDs in a linear manner.

Irrespective of the manner in which the cases are loaded/unloaded from the ULD, due to the interlocking and standardized size and shape of the cases of the present invention, airlines are able to optimise the luggage space for each flight, well before the flight departs. The standardized nature of the luggage items enables the airlines to identify, at ticket purchase, the number of luggage items each passenger will be carrying. Therefore, airlines are able to plan cargo capacity with a high degree of certainty, opening up the possibility for passenger airlines to utilise their luggage space for other commercial cargo applications. This can offer additional revenue streams for airlines to pursue, which has previously been difficult due to the random nature of the size and volume of conventional luggage.

Throughout the specification and claims the word “comprise” and its derivatives are intended to have an inclusive rather than exclusive meaning unless the contrary is expressly stated or the context requires otherwise. That is, the word “comprise” and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The invention claimed is:

1. A luggage unit comprising:

a substantially rigid body having a first portion at least partially releasably attached to a second portion to define a storage space for storing items therein;

the first portion having an outer surface with a plurality of rail members extending longitudinally thereon, each rail member projecting above the outer surface of the first portion to form at least one channel therebetween, wherein the at least one channel extends across a length of the outer surface of the first portion to form a continuous path over the outer surface of the first portion; and the second portion having an outer surface with at least one rail member extending longitudinally thereon, the at least one rail member projecting above the outer surface of the second portion, and configured to conform to the at least one channel formed in the outer surface of the first portion;

wherein each of the first portion and the second portion have a chamfered edge formed along an end thereof, the chamfered edge of the first portion being located at an opposite end of the substantially rigid body to the chamfered edge of the second portion and wherein the at least one channel formed in the outer surface of the first portion extends over and across the chamfered edge of the first portion to slidingly receive and locate the at least one rail member that extends over and across the chamfered edge of the outer surface of the second portion of an other luggage unit such that the at least one rail member of the other luggage unit is able to align with and slide within the continuous path formed by the at least one channel formed in the outer surface of the first portion of the luggage unit such that the other luggage unit slides in the continuous path longitudinally over the first portion of the luggage unit across the length of the luggage unit.

2. A luggage unit according to claim 1, wherein the at least one channel formed in the first portion of the substantially rigid body of the luggage unit has a locking ridge extending orthogonally with respect to the at least one channel, and the at least one rail member formed in the second portion of the substantially rigid body of the other luggage unit has a recess extending orthogonally with respect to the at least one rail member, such that when the other luggage unit is slidingly positioned on the luggage unit, the locking ridge of the luggage unit engages with the recess formed in the other luggage unit to prevent further sliding movement between the other luggage unit and the luggage unit.

3. A luggage unit according to claim 1, further comprising a handle member retractably mounted to the second portion so as to be received within a recess formed between each rail member.

4. A luggage unit according to claim 1, wherein at least two wheels are mounted to the body to facilitate movement of the luggage unit.

5. A luggage system comprising:

a plurality of luggage units, each luggage unit having a substantially rigid body having a first portion at least partially releasably attached to a second portion to define a storage space for storing items therein; the first portion having an outer surface with a plurality of rail members extending longitudinally thereon, each rail member projecting above the outer surface of the first portion to form at least one channel therebetween wherein the at least one channel extends across a length of the outer surface of the first portion to form a continuous path over the outer surface of the first portion; and the second portion having an outer surface with at least one rail member extending longitudinally thereon, the at least one rail member projecting above the outer surface of the second portion, and configured to conform to the at least one channel formed in the outer surface of the first portion; wherein each of the first portion and the second portion have a chamfered edge formed along an end thereof, the chamfered edge of the first portion being located at an opposite end of the substantially rigid body to the chamfered edge of the second portion and wherein the at least one channel formed in the outer surface of the first portion extends over and across the chamfered edge of the first portion and the at least one rail member formed in the outer surface of the first portion extends over and across the chamfered edge of the outer surface of the second portion;

wherein the luggage units are configured to move horizontally such that when the chamfered edge of the first portion of a luggage unit meets the chamfered edge of the second portion of an other luggage unit the at least one rail member of the second portion of the other luggage unit align with and extends into the at least one channel formed in the chamfered edge of the first portion of the luggage unit such that the at least one rail member of the second portion of the other luggage unit is slidingly received within the at least one channel formed in the first portion of the luggage unit such that the at least one rail member of the other luggage unit is able to slide within the at least one channel formed in the outer surface of the luggage unit such that the other luggage unit slides on top the luggage unit in a longitudinally manner over the luggage unit along a length of the lower luggage unit.

6. A luggage system according to claim 5, wherein each luggage unit is arranged in the vertical stack such that an upper luggage unit is supported on a lower luggage unit.

7. A luggage system according to claim 5, wherein each luggage unit is arranged in the vertical stack such that an upper luggage unit is supported between a pair of lower luggage units.

* * * * *